United States Patent Office 3,470,471
Patented Sept. 30, 1969

3,470,471
POLARITY COINCIDENCE CORRELATION METHOD AND APPARATUS FOR MEASURING ELECTRICAL ENERGY
Arthur D. Moore, Vancouver, British Columbia, Canada, assignor to Canadian Patents and Development Limited, Ottawa, Ontario, Canada, a corporation of Canada
Filed May 31, 1968, Ser. No. 733,575
Int. Cl. G01r 11/32
U.S. Cl. 324—142                          10 Claims

ABSTRACT OF THE DISCLOSURE

A device for measuring electrical energy of the watt-hour meter type which uses polarity-coincidence correlation consists of means for deriving first and second signal voltages related to the voltage and current on the line respectively means for generating first and second independent periodic voltage waveforms of uniform distribution of frequencies, means for comparing the levels of the first voltage and the first waveform and the second voltage and the second waveform, means for obtaining a logic signal of appropriate sign related to the product of the two comparators, means for sampling this signal periodically over an extended period of time, and an output counter that is incremented or decremented by one count at each sample.

---

This invention relates to a method and apparatus for measuring electrical energy and more particularly to a digital statistical device using polarity-coincidence correlation as the basis for a watt-hour type meter.

The common form of alternating-current watt-hour meter is essentially an induction motor. Its accuracy depends on the proper relative positioning of a disc between two magnetic circuits excited by line current and a current proportional to line voltage, and also upon the proper location of a shading coil on one of the magnetic structures and of a drag magnet which provides magnetic braking. Accuracy is affected by temperature, by frequency (and hence by waveform), and particularly by power factor. In addition, errors can arise if the meter is improperly installed, i.e., if the shaft is not vertical. In spite of these drawbacks, the induction watt-hour meter has had no serious competitor since the turn of the century, and has been developed to a high level of accuracy (better than ½% under some conditions) and to a very low cost.

The present invention is concerned with a watt-hour meter type of device which is all-electronic or nearly all-electronic and which operates on polarity-coincidence correlation principles. Y. W. Lee in the text "Statistical Theory of Communication" defines the correlation function between two variables $f_1(t)$ and $f_2(t)$, whether periodic, random or a combination of both, as the time average given by:

$$\phi_{12}(\tau) \triangleq \lim_{T \to \infty} \frac{1}{T} \int_0^T f_1(t) f_2(t+\tau) dt \quad (1)$$

Equation 1 can be transformed to a measure of average power over a finite interval by letting:

$$\tau = 0$$
$$T \to \infty \sim T \to T_{large}$$
$$f_1(t) \sim v(t)$$
$$f_2(t) \sim i(t)$$

Energy which is average power multiplied by time (T) is then:

$$E(v, i, T) = T\phi = \int_0^T v(t) i(t) dt \quad (2)$$

In all practical situations, e.g., A.C. supply metering, $v(t)$ and $i(t)$ are random variables and approximate sinusoids of randomly varying amplitude and phase. Their spectra are of very small bandwidth about the harmonics of the supply frequency with the fundamental usually dominant. The most useful energy meter is one whose operation is independent of the statistics of the input variables.

It has been shown by Jespers, Chu and Fettweis in a paper entitled "A New Method for Computing Correlation Functions," International Symposium on Information Theory, Brussels 1962, that integrals such as that shown in Equation 2 above can be evaluated through purely binary operations. Adapting their notation to the present situation, let $$v(t) \triangleq x_1(t), \text{ with } -A_1 < x_1 < A_1$$
$$i(t) \triangleq x_2(t), \text{ with } -A_2 < x_2 < A_2$$

and let $y_1(t)$ and $y_2(t)$ be noise waveforms independent of each other and of $x_1(t)$ and $x_2(t)$ but having uniform probability density distribution given by $$p(y_1) = (2A_1)^{-1}, |y_1| < A_1, \text{ and zero otherwise}$$

and $$p(y_2) = (2A_2)^{-1}, |y_2| < A_2, \text{ and zero otherwise}$$

Then if we define $$z_1(t) \triangleq x_1 - y_1$$

and $$z_2(t) \triangleq x_2 - y_2$$

the time average (with infinite averaging time) of the inputs $x_1$ and $x_2$ is given by $$\overline{x_1 \cdot x_2} = A_1 \cdot A_2 \overline{\text{sgn } z_1 \cdot z_2}$$

where $$\text{sgn } z = +1 \text{ if } z > 0$$

and $$\text{sgn } z = -1 \text{ if } z < 0$$

If the averaging time, T, is finite, the results above are still approximately valid if T is sufficiently long, i.e., if T is very much greater than the sampling period and also very much greater than the period of either reference waveform. This principle has been used successfully in a number of applications, notably correlation, to carry out integration by digital means, taking advantage of the binary character of sgn $z$. The variations that have been used differ principally in the method of producing the "reference noise," $y_i$. For broadband signals, $y_1$ and $y_2$ must be random and incoherent with each other and also with $x_1$ and $x_2$. The simplification that is possible when processing the "single frequency" signals occurring in power systems is that it is sufficient that $y_1$ and $y_2$ be independent periodic waveforms with uniform distribution (i.e., either triangular or sawtooth waves) of frequencies such as to avoid synchronism with any low-order harmonic or subharmonic of the line frequency.

Using such triangular waves as the reference "noise," and recognizing that the time average above is the average power, the energy transferred in the averaging time T is $$E = T \cdot A_1 \cdot A_2 \cdot \overline{\text{sgn } (x_1 - y_1)(x_2 - y_2)} \quad (4)$$

The essence of a digital statistical watt-hour meter according to the invention is given in the Equation 4 above. It will be realized that if $x_1$ and $x_2$ relate to the voltage and current values in a supply line and if circuitry for performing the functions required by Equation 4 can be devised then an effective watt-hour meter type of device may be obtained.

The object of the invention is to provide an energy measuring device of the watt-hour meter type that is compact, rugged, and which will provide sufficient and acceptable accuracy of operation for many purposes including electrical energy metering.

These and other objects of the invention are achieved by deriving first and second signal voltages related to the voltage and current values respectively existing on a power line to be metered, generating first and second independent periodic voltage waveforms of uniform distribution of frequencies chosen such as to avoid synchronism with harmonics or sub-harmonics of the line frequency, comparing the first signal voltage with the first voltage waveform and the second signal voltage with the second voltage waveform in two level comparators, obtaining a logic signal of appropriate sign related to the product of the output of the two comparators, sampling this signal periodically over an extended period of time, and applying the sampled logic output to an "up-down" counter so that it will be "incremented" or "decremented" by one count at each sample. The output of the counter when related to the appropriate system constants, e.g., the bounds or limits of the generated voltage waveforms and the operating time, gives an indication of electrical energy, e.g., a watt-hour reading. If the operating time (T) of the system is reasonably long then the accuracy of the device is such as to make it useful in many energy measuring applications.

In drawings which illustrate an embodiment of the invention,

Figure 1:
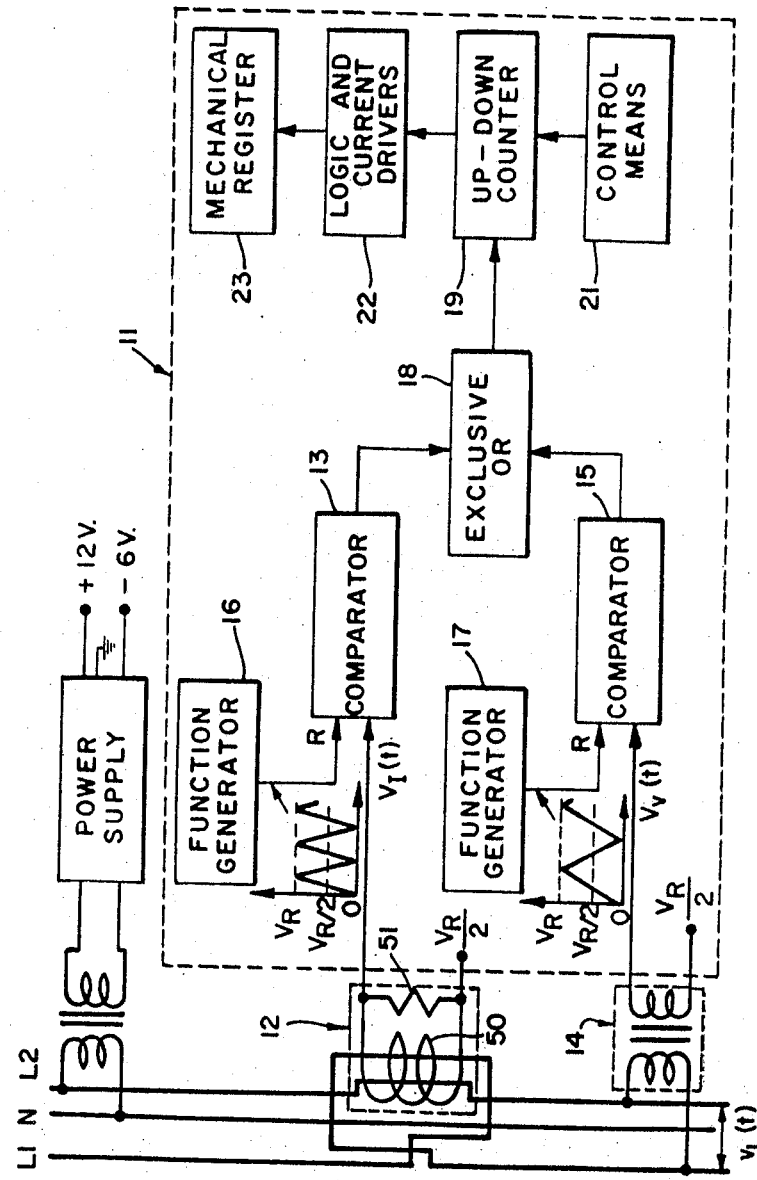
FIGURE 1 is a block diagram of a circuit for measuring electrical energy.

Referring to FIGURE 1, a typical power line (L1, N, L2) to be metered carries line voltage $v_L(t)$ and current $i_L(t)$ and these will be random variables approximating sinusoids of varying amplitude and phase. A first signal voltage $v_v(t)$ proportional to the line voltage is obtained by potential transformer 14, and second signal voltage $v_I(t)$ proportional to the line current is obtained via current transformer 12 having a secondary winding 50 and load or burden resistor 51. These two voltages, which are referred not to ground but to a voltage $V_R/2$, the reason for which will become apparent later, are fed to the metering circuit designated generally as 11 and are fed to terminals of voltage level comparators 15 and 13 respectively. Sawtooth function generators 16 and 17 generate voltage waveforms of constant amplitude whose limits or bounds are $V_R$ and 0 volts and therefore whose mid-line voltage is $V_R/2$. These waveforms, which must not be of equal frequency or of frequencies having a similar harmonic or sub-harmonic, are fed to the other terminals of comparators 13 and 15. These comparators, which may be commercially available voltage lever comparators, e.g., Fairchild comparator model µA710, continuously compare the voltage inputs $v_v(t)$ and $v_I(t)$ with the respective voltages from the waveform generators and provide outputs of the form of the functions sgn $(v_v-v_{rv})$ and sgn $(v_I-v_{rI})$ where $v_{rv}$ and $v_{rI}$ are the instantaneous voltages of the waveform generators. It will be seen that these are analogous to sgn $z_1$ and sgn $z_2$ of Equation 3. The multiplication of these sgn functions is obtained in COMPLEMENTED EXCLUSIVE OR circuit 18 which gives a logic output of the form sgn $$(v_v-v_{rv}) \cdot (v_I-v_{rI})$$

or sgn $z_1 \cdot z_2$. This output is applied to up-down counter 19 and is sampled periodically by clock control means 21 to determine whether the counter should be "incremented" or "decremented" by one count at each sample. For a large number of samples, the state of the counter which would be indicated on regular 23 via suitable logic and current drives 22 would be directly proportional to T·sgn $(v_v-v_{rv}) \cdot (v_I-v_{rI})$ or T·sgn $z_1 \cdot z_2$ of Equation 3, with an accuracy depending only on the stability of the sample clock. An additional condition on the clock rate is that it should be independent of all other frequencies in the system, or, if related to the line frequency, the least common multiple of line frequency and the clock frequency should be very high compared to either.

With perfectly triangular reference waveforms, the only other factors affecting the accuracy of the watt-hour meter are the two reference levels $A_1$ and $A_2$ which are related to the voltage $V_R$. The signal voltages $v_v(t)$ and $v_I(t)$ should have the same phase difference as the line voltage and current they represent and this requires some care in the design and selection of transformers 12 and 14 or other devices that could be used to derive the signal voltages, e.g., voltage divider and shunt resistor. A power supply for providing the D.C. operating voltage levels can be conveniently taken from the supply line itself.

Figure 2:
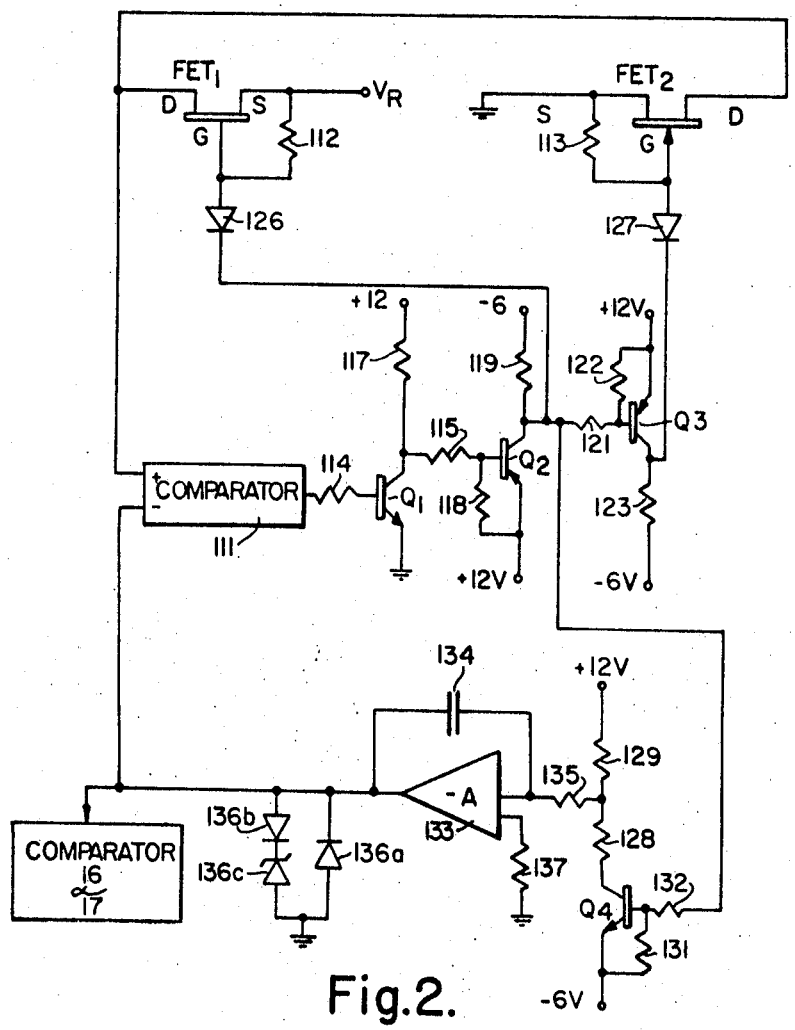
FIGURE 2 is a circuit diagram of a voltage waveform generator that could be used in the circuit of FIGURE 1.

Although it will be realized that various forms of the different components in the apparatus could be devised by those skilled in the circuit design field and no particular claim is being made for novelty of these components as such, a useful and highly precise triangular saw-tooth waveform generator has been devised and is shown in FIGURE 2. Assuming field-effect transistor $FET_1$ to be ON, then the positive input to comparator 111 is at $V_R$ volts and the negative input will be at a level less than $V_R$ volts which will result in a positive output from the comparator 111. Transistor $Q_1$ will then be ON, $Q_2$ is ON, $Q_3$ is OFF, and $Q_4$ is ON, which means $FET_1$ is ON, $FET_2$ is OFF and the Miller integrator made up of operational amplifier 133 and associated capacitor 114 is being charged from a negative providing a positive-going ramp at its output. When this voltage ramp reaches $V_R$, the output of comparator 111 becomes slightly negative so that $Q_1$, $Q_2$, $Q_3$, and $Q_4$ reverse their states which causes $FET_1$ to be cut off and $FET_2$ to come on. A negative-going ramp then appears at the output of the Miller integrator and continues until it reaches ground level at the negative input of the comparator at which time the process is repeated. The resulting triangular saw-tooth voltage is applied to either comparator 16 or 17 of FIGURE 1 as appropriate. The circuit includes suitable power supply points and biasing resistors 112 to 123, 128 to 132, and 135 and 137. The output of the integrator is connected to ground via a diode 136b and Zener diode 136c and also via a diode 136a to remove state transition transients and provide the appropriate clipping levels. Although a triangular waveform generator is described here, a saw-tooth waveform or other forms of regularly recurring waves might be used provided they meet the necessary statistical requirements.

Figure 3:
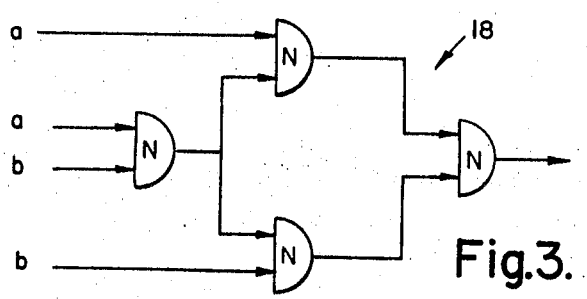
FIGURE 3 is a logic diagram of a "COMPLEMENTED EXCLUSIVE OR" circuit for use in the circuit of FIGURE 1.

Referring to FIGURE 3, a COMPLEMENTED EXCLUSIVE OR circuit 18 using NOR logic elements N provide multiplication of the two sign functions, sgn $(v_v-v_r)$ and sgn $(v_I-v_r)$ obtained from the two comparators by performing the Boolean operation $$d=ab+a'b'$$

to provide an output in terms of $$\text{sgn } (v_v-v_r) \cdot \text{sgn}(v_I-v_r)$$

Figure 4:
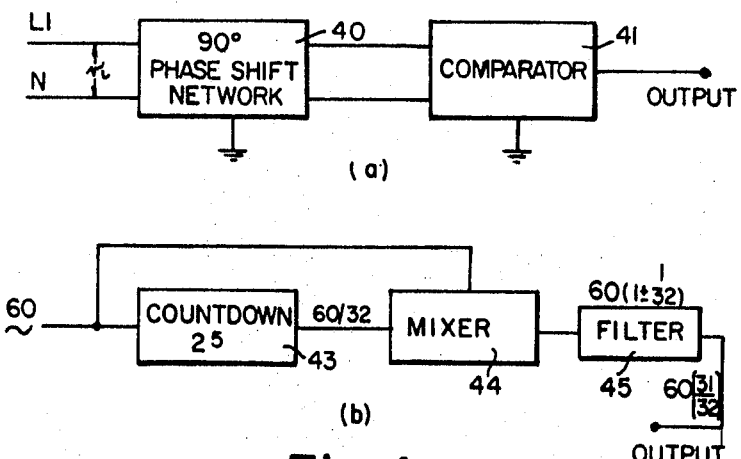
FIGURE 4 shows two versions (a) and (b) of a suitable sampling clock.

It will be realized that the accuracy of the system is directly affected by the accuracy of the sampling clock which sets the sampling rate and triggers or controls the up-down counter. High accuracy clocks are in existence but for a practical and inexpensive watt-hour meter, a simpler clock is required. A simple, independent clock using a tuning-fork reference similar to that employed by certain watch manufacturers may be used and will provide an accuracy of better than 1 part in $10^4$. A synchronous clock dependent on line frequency is shown in FIGURE 4(a). Voltage obtained from the line is shifted in phase 90° in circuit 40 and applied to comparator 41 which gives an output at each positive peak of line voltage. This arrangement is suitable if the harmonic content of line voltage is negligible but does require compensation for a scale factor of two in succeeding circuits. FIGURE 4(b) shows another form of clock that provides clock pulses that have a frequency slightly different from line frequency. The line frequency (60 cycle) is divided by a countdown network 43, e.g., to give an output pulse every $32/60$ of a second and this frequency ($60/32$ Hertz) and the line frequency algebraically summed in mixer 44 and filtered to eliminate unwanted frequencies in filter 45 to give a clock frequency of either $60+60/32$ or $60-60/32$ cycles per second.

In the above description the sampling action is applied to the up-down counter. This could also take place before the multiplication circuit or even before the comparators. It has been found convenient to provide function generators whose output waveforms vary about $V_R/2$ volts between the limits $V_R$ and 0 rather than about ground level. This, of course, is the reason for the potential and current transformers being referred to $V_R/2$ volts.

A digital statistical watt-hour meter operating by polarity-coincidence correlation has been described above and is one that may be made to be all-electronic if so desired. With the exception of the potential transformer, the current transformer and some parts of the power supply, it is feasible to fabricate the whole apparatus on no more than three or four silicon chips, and possibly on a single chip, at the present state of semiconductor technology. Such fabrication methods lend themselves to high-volume production at extremely low costs so that a meter of this type will become economically competitive in the foreseeable future. Semiconductor voltage references having very high stabilities over relatively wide temperature ranges are available and therefore the stability of a meter built on the teaching of this disclosure can be assured over the whole temperature range to which domestic meters are exposed.

The statistical watt-hour meter will appear to have rather large errors if observed for a short time but the statistical errors are negligible after several hours, and as the domestic meter is normally read infrequently, such performance is completely adequate. The device described here also lends itself to adaptation for remote reading. If, for example, a magnetic register is used at the output, the information is available directly in the format needed for such purposes.

Although the description here has been primarily directed to A.C. supply metering, the principles would be readily applicable to D.C. metering.

What is claimed is:

1. Apparatus for measuring electrical energy by polarity-coincidence correlation comprising:
    (a) means for obtaining a first signal voltage related to the voltage existing on the power line to be metered,
    (b) means for obtaining a second signal voltage related to the current existing on the power line,
    (c) means for generating first and second independent periodic voltage waveforms of uniform instantaneous amplitude distribution of frequencies chosen such as to avoid synchronism with harmonics or sub-harmonics of the line frequency,
    (d) a first comparator to compare the first signal voltage and the first voltage waveform and provide a logic output in sign function form,
    (e) a second comparator to compare the second signal voltage and the second voltage waveform and provide a logic output in sign function form,
    (f) means for multiplying in logic terms the outputs from the two comparators,
    (g) counter means for integrating the output of the multiplying means over a relatively extended period of time,
    (h) a sampling clock connected such that the said counter will receive a sample of the multiplied output of the two comparators at a stable sampling rate, and
    (i) output register means for indicating the output state of the counter.

2. Apparatus for measuring electrical energy as in claim 1 wherein the generated voltages have sawtooth waveforms.

3. Apparatus for measuring electrical energy as in claim 1 wherein the generated voltages have triangular waveforms.

4. Apparatus for measuring electrical energy as in claim 1 wherein the counter means is an "up-down" counter whose count is either incremented or decremented by one count on receipt of a sample input.

5. Apparatus for measuring electrical energy as in claim 1 wherein the sampling clock is dependent on the power line frequency.

6. Apparatus for measuring electrical energy as in claim 1 wherein the multiplying means is a complemented exclusive or logic circuit.

7. A method of measuring electrical energy by polarity-coincidence correlation comprising:
    (a) obtaining first and second sign voltages related to the voltage and current existing on the power line to be metered,
    (b) generating first and second independent, periodic waveforms of predetermined amplitude limits and uniform instantaneous amplitude distribution of frequencies chosen such as to avoid synchronism with harmonics or sub-harmonics of the line frequency,
    (c) comparing the first signal voltage with the first voltage waveform and the second signal voltage with the second voltage waveform in voltage comparators giving outputs in sign function terms of either $+1$ or $-1$,
    (d) multiplying the outputs received from the comparators,
    (e) sampling this result at a stable sampling rate,
    (f) applying the sampled readings to a counter adapted to integrate the sample inputs over an extended period of time, and
    (g) taking an output from the counter in terms of system constants to provide a measure of the energy on the line.

8. A method of measuring electrical energy as in claim 7 wherein the generated voltages have sawtooth waveforms.

9. A method of measuring electrical energy as in claim 7 wherein the generated voltages have triangular waveforms.

10. A method of measuring electrical energy as in claim 7 wherein the counter used is an "up-down" counter whose count is incremented or decremented by one count on receipt of a sample input either $+1$ or $-1$.

References Cited

UNITED STATES PATENTS

| | | | |
|---|---|---|---|
| 3,226,641 | 12/1965 | Miller | 324—142 |
| 3,281,584 | 10/1966 | Martiner | 235—194 |

ALFRED E. SMITH, Primary Examiner

U.S. Cl. X.R.

307—218, 228, 279; 328—160